US012682697B2

(12) United States Patent
Binding et al.

(10) Patent No.: US 12,682,697 B2
(45) Date of Patent: Jul. 14, 2026

(54) METHOD FOR PROCESSING DATA IN A VEHICLE

(71) Applicant: Robert Bosch GmbH, Stuttgart (DE)

(72) Inventors: Jonas Binding, Stuttgart (DE); Philipp Ferdinand Rapp, Tuebingen (DE); Tobias Hohenthanner, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 308 days.

(21) Appl. No.: 18/152,337

(22) Filed: Jan. 10, 2023

(65) Prior Publication Data

US 2023/0230429 A1 Jul. 20, 2023

(30) Foreign Application Priority Data

Jan. 18, 2022 (DE) ..................... 10 2022 200 510.4
Aug. 5, 2022 (DE) ..................... 10 2022 208 181.1

(51) Int. Cl.
*G07C 5/00* (2006.01)
*G07C 5/08* (2006.01)
*H04L 67/12* (2022.01)

(52) U.S. Cl.
CPC ........... *G07C 5/0808* (2013.01); *G07C 5/008* (2013.01); *G07C 5/085* (2013.01)

(58) Field of Classification Search
CPC ...... G07C 5/0808; G07C 5/008; G07C 5/085; G07C 5/006; G07C 5/0816; G07C 5/0841; G07C 5/00; G07C 9/00563; H04L 67/12
USPC .......................................................... 701/33
See application file for complete search history.

(56) References Cited

U.S. PATENT DOCUMENTS 11,891,088 B1 * 2/2024 Kobilarov ............ G07C 5/0808
2012/0296514 A1 * 11/2012 Sohmshetty ........... G07C 5/008 707/790
2020/0068434 A1 * 2/2020 Pedersen ................. H04W 4/46
2020/0193736 A1 * 6/2020 Lawrence .............. G07C 5/085
2021/0407224 A1 * 12/2021 Ahearne ................. H04W 4/70
2022/0343700 A1 * 10/2022 Wehinger ............ B60W 60/001
2023/0115290 A1 * 4/2023 Ogawa ................ H04L 67/1095 701/24

FOREIGN PATENT DOCUMENTS

DE 102017201226 A1 * 7/2018

* cited by examiner

*Primary Examiner* — Hossam M Abd El Latif
(74) *Attorney, Agent, or Firm* — NORTON ROSE FULBRIGHT US LLP

(57) ABSTRACT

A method for processing data in a vehicle. The method includes: a) receiving data of components of the vehicle, b) checking the received data with respect their value for the development, further development, and/or the serial operation of vehicles and/or components thereof, c) deciding in consideration of step b) whether the data are to be stored in the vehicle (1) or sent to a vehicle-external location.

7 Claims, 1 Drawing Sheet

METHOD FOR PROCESSING DATA IN A VEHICLE

CROSS REFERENCE

The present application claims the benefit under 35 U.S.C. § 119 of German Patent Application Nos. DE 10 2022 200 510.4 filed on Jan. 18, 2022, and DE 10 2022 208 181.1 filed on Aug. 5, 2022, which are expressly incorporated herein by reference in their entireties.

FIELD

The present invention relates in particular to improving the balance between costs for data transfer and the costs for data storage during development and operation of automated driving.

BACKGROUND INFORMATION

Semiautomated vehicles (SAE ADAS levels 0-3), and to an even greater extent highly automated vehicles (SAE ADAS level 4/5), use a variety of sensor modalities to create a depiction of the surroundings that generate large amounts of data. For the development and later continuous improvement in operation of the system, it is advantageous to transfer at least a portion of these data into the development backend or store it for further developments.

For this purpose, storage in the vehicle with later wired transfer and contactless transfer are described in the related art. Costs for storage or transfer methods result for both methods. In development vehicles for level 4, data are often transferred in terabytes per day, for example, this usually takes place at the end of the workday upon the return to the factory site. If the memory capacity in the vehicle is reached in the course of the day, continuing to drive is no longer worthwhile and the safety driver returns to the factory site. Data are often also recorded on long routes which are not relevant for the further development, because upon later analysis the data do not contain any novelty value or helpful new pieces of information for the development or improvement of the system. Situations of interest (for example, those in which the nominal state of the system is left and one of the fallback mechanisms is activated, or situations in which one or multiple KPIs exceed or fall below a defined threshold value) tend to occur more rarely with progressing development. The recording campaigns therefore have to become longer and longer over the course of time, and optimization of installed memory capacity for each vehicle and driving duration may help to minimize inefficiencies. At SAE levels 0-3, the amounts of data are typically smaller, but also represent a challenge.

In operation of unlocked vehicle fleets, contactless transfer (e.g., mobile radio, Wi-Fi) for transmitting data between vehicle and a backend is described in the related art. This may be used, for example, for crowdsourcing of data sets. Due to the transfer costs, in such systems it is often decided according to previously defined rules which data are to be transferred how frequently, and the transfer volume is limited to small amounts of data, for example, to a few kilobytes or megabytes per day and vehicle. It has historically not been distinguished ad hoc how valuable the specific presently collected data are. Vehicles without data connection also have a permanent memory (for example error memory) only for comparatively small amounts of data, for example, error events in particular, which is then first read out during the next visit to the workshop.

SUMMARY

An object of the present invention is to reduce data storage costs and data transfer costs during development and in operation. The object may be achieved by the features of the present invention. Advantageous refinements of the present invention are disclosed herein.

According to an example embodiment of the present invention, a method for processing data in a vehicle contributes thereto, including at least the following steps:

a) receiving data of components of the vehicle, b) checking the received data with respect to its value for the development, further development, and/or the serial operation of vehicles and/or components thereof, c) deciding in consideration of step b) whether the data are to be stored in the vehicle or sent to a vehicle-external location.

Steps a), b), and c) may be carried out, for example, at least once and/or repeatedly or multiple times in succession in the indicated sequence to carry out the method. Furthermore, steps a), b), and c), in particular steps a) and b) may be carried out at least partially in parallel or simultaneously.

The vehicle may be a motor vehicle, for example, such as an automobile. The vehicle may be configured, for example, for at least semiautomated or autonomous driving operation.

The method advantageously contributes to reducing data storage costs and data transfer costs during development and in operation. One basic feature of the present invention may be seen in being able to carry out an initial preliminary assessment of recorded data, in particular according to their financial value, already in the vehicle, in order to decide about preliminary storage or even prompt or immediate transfer.

The underlying value of the data is determined here in particular by the technical usability for the development, further development, and/or the serial operation of vehicles. It has a positive effect on the value of the data, for example, if the data are useful for the further development of certain components (for example, sensor components or for components for carrying out an autonomous driving operation or also any other components)—for example to find software errors or for similar tasks. It also has a positive effect on the value of the data, for example, if the data may be used in a vehicle fleet to be able to identify a particularly critical (because of far-reaching) error. Such data would be, for example, pieces of information which are acquired in the vehicle and which also permit a conclusion about possible errors in other vehicles of the fleet. Such data are, for example, also data which indicate whether a component of a vehicle is in good technical condition or possibly has to be maintained or replaced.

The value of the data underlying the method is preferably formed by a parameter, in which various types of the technical usability of the data are reduced to a shared value parameter, which enables an efficient decision in step c). The value parameter may be expressed as a monetary parameter (i.e., for example, in euros or dollars). However, the value of the parameter is typically at least prominently technically related. The value may thus also (significantly) increase, for example, with increasing technical relevance of an error source. The expression as a monetary parameter advantageously permits the most efficient possible representation of possible consequence(s) of technical relationships, in particular also encompassing a large number of identical components and/or vehicles.

One advantageous aspect in the determination of the value of the data may be represented by the influence of the timeliness of the data on their value. The check of the value of the data in step b) is preferably carried out in consideration of an influence of the timeliness of the data. The value of the data is high in the case of certain data, for example, directly after the occurrence of the data in the vehicle, while the value may decrease very rapidly when the data lose timeliness.

According to an example embodiment of the present invention, in step a), data are received of components. In particular, the components are formed by at least one sensor of the vehicle. The at least one sensor may include, for example, one or multiple surroundings sensors such as camera sensors, LIDAR sensors, RADAR sensors, ultrasonic sensors, or the like. Alternatively or cumulatively, the at least one sensor may include one or multiple sensors for detecting driving operation parameters, such as wheel speed sensors, acceleration sensors, or the like.

According to an example embodiment of the present invention, in step b), the received data are checked with respect to their value for the development, further development, and/or the serial operation of vehicles and/or components thereof. The vehicles or components may be, for example, those which are identical or similar (for example from a similar vehicle series) to those in the vehicle or components used for carrying out the method. In particular, in step b), a value parameter may be ascertained or determined which represents the technical value or the technical relevance of a piece of technical information contained in the data or described by the data, in particular in a monetary unit (for example euros or dollars).

According to an example embodiment of the present invention, in step c) a decision takes place in consideration of step b) whether the data are to be stored in the vehicle or sent to a vehicle-external location. For this purpose, for example (in the first case) a vehicle-internal memory or (in the second case) a vehicle-external memory may be used. The data transfer may take place via vehicle-to-X (car-to-X) communication.

According to one advantageous embodiment of the present invention, it is provided that steps a), b), and c) are carried out at the vehicle and/or by a control unit of the vehicle. In other words, this may also be described as steps a), b), and c) being carried out internally in the vehicle.

According to another advantageous embodiment of the present invention, it is provided that the vehicle is a development vehicle or a series-production vehicle. In particular, a first assessment with respect to the relevance and/or the utility of the data may thus advantageously already be carried out in the vehicle itself, so that storage costs and/or transfer costs may possibly be saved.

According to another advantageous embodiment of the present invention, it is provided that in step b), the data are assessed with respect to their financial value for the development, further development, and/or the serial operation. A corresponding monetary rough assessment may enable an advantageously goal-oriented description of the consequence(s) of technical relationships and in particular technical problems.

According to another advantageous embodiment of the present invention, it is provided that in step b), a cost function is used to assess the data. A cost function formulated in financial variables (for example euro value for vehicle operators) has the advantage in particular of being able to be incorporated directly and immediately in action decisions or the definition of action rules.

A cost function is preferably established in consideration of the technical usability of the data. The cost function is preferably also established in consideration of the timeliness of the data for its usability.

According to another advantageous embodiment of the present invention, it is provided that the checking and/or the cost function may be adapted. This may be carried out in particular to guide the focus of the data collection deliberately onto certain situations or aspects. For example, this may be carried out to be able to collect the required data to end a driving ban.

An adaptation of the cost function preferably takes place if a change of the technical usability of the data occurs, for example because due to further developments, the technical utility of certain data has increased or (in comparison to other available data) has decreased.

According to another advantageous embodiment of the present invention, it is provided that a prioritization is carried out with respect to the relevance of the data. The prioritization may contribute, for example, to deciding that data are possibly also to already be wirelessly transferred live during a test run.

According to a further aspect of the present invention, a computer program for carrying out a method presented here is provided. This relates in other words in particular to a computer program (product), including commands which, when the program is executed by a computer, prompt it to carry out a method described here.

According to a further aspect of the present invention, a machine-readable memory medium is provided, on which the computer program provided here is saved or stored. The machine-readable memory medium is generally a computer-readable data medium.

According to a further aspect of the present invention, a control unit for a vehicle is provided, configured for carrying out a method described here. The control unit may include, for example, a computer and/or a controller which may execute commands to carry out the method. For this purpose, the computer or the controller may execute the specified computer program, for example. For example, the computer or the controller may access the specified memory medium to be able to execute the computer program.

The details, features, and advantageous embodiments of the present invention explained in conjunction with the method may accordingly also occur in the computer program presented here and/or the memory medium and/or the control unit and vice versa. Reference is insofar made to the entirety of the statements made therein for the more detailed characterization of the features.

The approach presented here and its technical surroundings will be explained in greater detail hereinafter on the basis of the figures. It is to be noted that the present invention is not to be restricted by the exemplary embodiments shown. In particular, if not explicitly indicated otherwise, it is also possible to extract partial aspects of the substantive matter explained in the figures and combine them with other components and/or findings from other figures and/or the present description.

DETAILED DESCRIPTION OF EXAMPLE EMBODIMENTS

Figure 1:
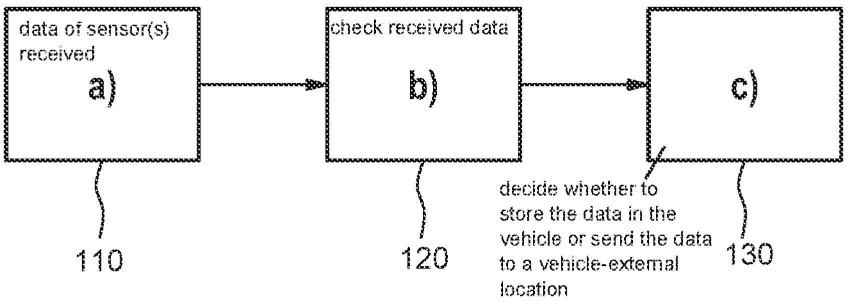
FIG. 1 shows an exemplary flowchart of the method according to the present invention, presented herein.

FIG. 1 schematically shows an exemplary flowchart of the method presented here. The method is used for processing data in a vehicle 1 (cf. FIG. 2). The sequence of steps a), b), and c) represented by blocks 110, 120, and 130 is by way of example and may be run through at least once in the illustrated order to carry out the method, for example.

In block 110, according to step a), data are received of components, the components being formed in particular by at least one sensor 2, 3 of vehicle 1. In block 220, according to step b), the received data are checked with respect to their value for the development, further development, and/or the serial operation of vehicles and/or components thereof. In block 130, according to step c), it is decided taking into consideration step b) whether the data are to be stored in vehicle 1 or sent to a vehicle-external location.

One basic feature of the method may be considered that of being able to carry out already in the vehicle an initial preliminary assessment of recorded data, in particular according to its financial value, in order to decide about a preliminary storage or even prompt or immediate transfer. Such a (cost) function for assessing data, as a decision criterion for, for example, the options “send mobile,” “send as soon as possible via WLAN,” “store,” “discard” could take into consideration, for example, as a contribution a “measure of surprise,” thus to what extent the up-to-date data stream deviates from known patterns.

Using an advantageous cost function, which is expressed as an approximation in euro, on the one hand, the size of the installed memory media may advantageously be improved; on the other hand, it advantageously permits, instead of prematurely ending a trip when the memory is full, overwriting the data sections including the lowest value for the further development with new (more valuable) data and saving memory space.

Steps a), b), and c) may be carried out, for example, in the vehicle and/or by a control unit 4 for vehicle 1. Furthermore, vehicle 1 may be a development vehicle or a series-production vehicle.

The present invention may be used both in development vehicles and in series-production vehicles. In development vehicles, more computing power is potentially available for the computation of more complex (cost) functions, while larger amounts of data also arise and a daily data transfer upon return to the factory site may be a standard feature for many vehicles. In series-production vehicles, the (cost) function may take into consideration the more limited computing power and memory availability significantly more strongly and advantageously prioritize data streams which are relevant to operation and further development over others for storage and transfer.

For example, in step b), the data may be assessed with respect to their financial value for the development, further development, and/or the serial operation. In particular, in step b), a cost function may be used to assess the data.

A cost function formulated in financial variables (for example euro value for vehicle operators) has the advantage of being able to be incorporated directly and immediately in action decisions and the definition of action rules. By continuous observation of the subsequently established utility of certain data, the cost function may be gradually improved over time, in order to preferably set up the fleet for good further development(s) and/or series operation and/or to maximize the value of the data recording and transfer. Different cost rates may be taken into consideration for WLANs placed along the route, 4G or 5G transfer, and/or various data memory media.

In particular, such a concept may advantageously enable the attention of the data collection to be deliberately guided onto certain situations in particular situations by adapting the relevant parameters, for example, to be able to collect the required data for ending a driving ban.

An example from a neighboring industry in this regard: The flight bans for a total of 387 specimens of the Boeing 737 Max aircraft in a period of time of 20 months in 2019/2020 alone resulted in $8.6 billion in compensation by the aircraft producer to its customers, in total over $20 billion direct costs for Boeing. This thus corresponds to approximately $1 billion per month, or $30 million per day. In addition, there were the losses which had to be borne by the airlines themselves.

Since the automobile industry has more sales than the aircraft industry by approximately an order of magnitude, in perspective a high cluster risk is also to be expected for large L4 fleets due to driving bans (as a result of software or system deficiencies). In the case of ~€50,000 sales per vehicle and year, for example, a fleet of 100,000 vehicles would result in a loss of >€13 million per day of driving ban, so that high investments would be applied to accelerate the end of a driving ban.

This represents an example that and possibly how the checking and/or the cost function may be adapted, in particular to guide the focus of the data collection deliberately onto certain situations or aspects, for example, to be able to collect the required data to end a driving ban.

Many embodiments may also be derived from the basic features described herein. For example, driving KPIs such as time-to-collision or nonfunctional KPIs such as memory utilization or frequency of runtime overruns of individual algorithms could be incorporated into the cost function to assess a driving scene. The sensor raw data of a scene could also be classified as less valuable if both perception and fusion do not observe KPIs having extraordinary values here, and/or as significantly more valuable if deviating or extraordinary assessments of the observed scene arise in perception, fusion, or planning.

In another advantageous embodiment of the present invention, the cost function may decide not only about storage of data, but may also prioritize which data are possibly also to be wirelessly transferred already live during a test drive. In particular if a large fleet of commercially used vehicles should once have a driving ban due to an irregularity in the software, shortening the data evaluation cycles to reacquire the driving license could have a high financial value.

This represents an example that and possibly how a prioritization with respect to the relevance of the data may take place.

In another advantageous embodiment, various vehicles may transfer their (sufficiently valuable) data packets to one another via vehicle-to-vehicle (V2V) communication, when they come (sufficiently) close to one another in road traffic. The memory space in the vehicles may thus be better utilized (inter-vehicle storage space load-balancing) and/or particularly urgent or valuable data packets may thus also be conveyed back into the factory site, in particular advantageously earlier or faster and/or without 4G/5G transfer costs, if vehicles are underway, for example, in only partially overlapping shifts.

In another advantageous embodiment, the check or the cost function for the data also takes into consideration cross-vehicle aspects; for example, if a driving situation of interest was observed and recorded simultaneously by various (experimental) vehicles from different perspectives, this may increase the value of the overall data set. Vice versa, if a new driving situation is observed similarly or identically in rapid succession by multiple vehicles, the novelty value and thus the information content may decrease with each further observation, so that, for example, the prioritization and thus the financial assessment in particular of the same observation may be continuously reduced in following vehicles.

Figure 2:
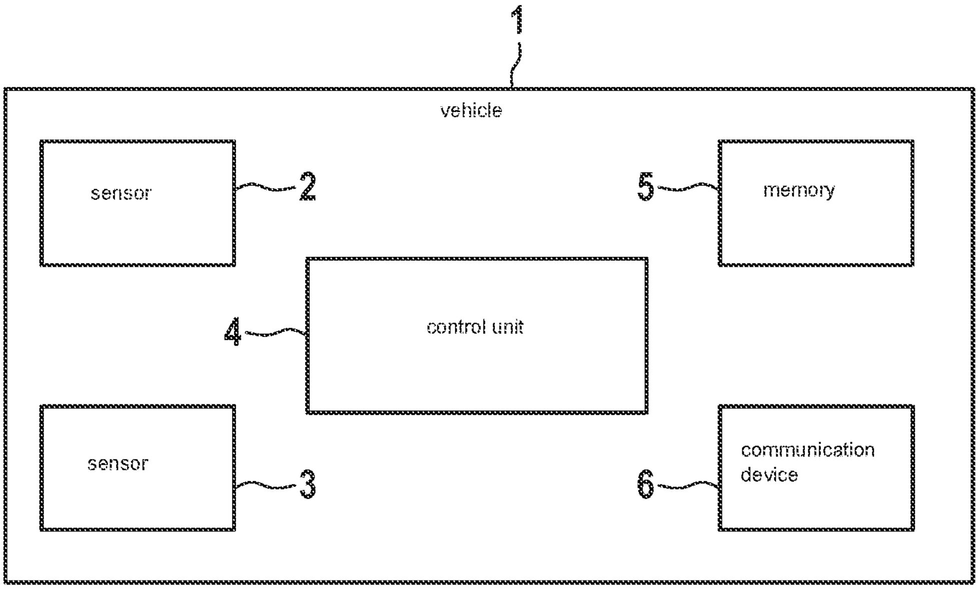
FIG. 2 shows an exemplary vehicle including a control unit according the present invention, described herein.

FIG. 2 schematically shows by way of example a vehicle 1 including a control unit 4, which is configured to carry out a method described here. Control unit 4 may receive data of sensors 2, 3 of vehicle 1. Control unit 4 may check the data with respect to its value for the development, further development, and/or the serial operation of vehicles and/or components thereof. Furthermore, control unit 4 may decide whether the data are to be stored in vehicle 1, for example, in a memory 5, and/or are to be sent, for example, with the aid of a communication device 6 of vehicle 1 to a vehicle-external location, such as a higher-order management device.

For this purpose, for example, an algorithm for assessing the data (driving data, vehicle data, and/or sensor data) may be executed in control unit 4. The data may originate, for example, from one or multiple of the following components: sensors, PER, FUSION, PLANNER, MAP/LOC, state & error management, motion control, interior sensing, etc.

The method advantageously contributes to reducing data memory costs and data transfer costs during development and in operation.

What is claimed is:

1. A method for processing data in a vehicle, comprising the following steps:

a) receiving, by a processor of the vehicle, raw data generated by sensors of the vehicle;

b) assigning, by the processor, to each datum of the received raw data, a respective value for development and/or further development and/or serial operation of: vehicles and/or components of the vehicle, wherein the respective values are expressed as costs and wherein the assigning is performed using a cost function that, for each datum, characterizes the respective datum with respect to each of a plurality of predefined usability characteristics and that outputs, based on the characterizations, the respective single overall value assigned to the respective datum, wherein the usability characteristics include a technical relevancy characteristic that is assigned to the respective datum and that defines a predefined technical use for which the respective datum is relevant and/or a degree of relevance of the respective datum for the predefined technical use, a time characteristic of the respective datum, and/or a deviation from expectation characteristic of the respective datum;

c) dividing, by the processor, the received raw data into different handling methodologies according to differences between the respective costs assigned to different respective data of the received raw data, with a first one or more of the received raw data, due to being assigned respective costs that are within a first value range, being allocated to be handled according to a first of the handling methodologies, a second one or more of the received raw data, due to being assigned respective costs that are within a second value range that is lower than the first value range, being allocated to be handled according to a second of the handling methodologies, a third one or more of the received raw data, due to being assigned respective costs that are within a third value range that is lower than the first and second value ranges, being allocated to be handled according to a third of the handling methodologies, and a fourth one or more of the received raw data, due to being assigned respective costs that are within a fourth value range that is lower than the first, second, and third value ranges, being allocated to be handled according to a fourth of the handling methodologies, wherein:

the first handling methodology is to perform a wireless transmission to a vehicle-external location with any most immediately available one of wireless transmission modalities with which the vehicle is configured;

the second handling methodology is to perform a wireless transmission to the vehicle-external location with any most immediately available one of only a subset of the wireless transmission modalities with which the vehicle is configured;

the third handling methodology is to perform, at least during an immediate defined time period, an initial local storage in a local data storage of the vehicle without wireless transmission; and the fourth handling methodology is to be discarded without being transmitted;

d) performing, by the processor, the transmissions, local storage, and discarding according to the division of step c);

e) performing, by the processor, an autonomous driving control of the vehicle; and f) upon running out of storage space in the local data storage for a newly obtained datum, overwriting, by the processor, one or more of the received raw data previously stored in the local data storage, so that the autonomous driving control of the vehicle is not prematurely ended due to the local data storage being full, wherein the transmissions to the vehicle-external location provide data to an evaluation based on which a restriction previously placed on the autonomous driving control of the vehicle is removed.

2. The method as recited in claim 1, wherein the vehicle is a development vehicle or a series-production vehicle.

3. The method as recited in claim 1, wherein in step b), the data are assessed with respect to their financial value for the development, and/or the further development, and/or the serial operation.

4. The method as recited in claim 1, wherein the cost function is modified over time to differently value, over time, respective costs of one or more of the received raw data based on observations regarding utility of the respective raw data.

5. A non-transitory machine-readable memory medium on which is stored a computer program for processing data in a vehicle, the computer program, when executed by a computer of the vehicle, causing the computer to perform the following steps:

a) receiving, by the computer, raw data generated by sensors of the vehicle;

b) assigning, by the computer, to each datum of the received raw data, a respective value for development and/or further development and/or serial operation of: vehicles and/or components of the vehicle, wherein the respective values are expressed as costs and wherein the assigning is performed using a cost function that, for each datum, characterizes the respective datum with respect to each of a plurality of predefined usability characteristics and that outputs, based on the characterizations, the respective single overall value assigned to the respective datum, wherein the usability characteristics include a technical relevancy characteristic that is assigned to the respective datum and that defines a predefined technical use for which the respective datum is relevant and/or a degree of relevance of the respective datum for the predefined technical use, a time characteristic of the respective datum, and/or a deviation from expectation characteristic of the respective datum;

c) dividing, by the computer, the received raw data into different handling methodologies according to differences between the respective costs assigned to different respective data of the received raw data, with a first one or more of the received raw data, due to being assigned respective costs that are within a first value range, being allocated to be handled according to a first of the handling methodologies, a second one or more of the received raw data, due to being assigned respective costs that are within a second value range that is lower than the first value range, being allocated to be handled according to a second of the handling methodologies, a third one or more of the received raw data, due to being assigned respective costs that are within a third value range that is lower than the first and second value ranges, being allocated to be handled according to a third of the handling methodologies, and a fourth one or more of the received raw data, due to being assigned respective costs that are within a fourth value range that is lower than the first, second, and third value ranges, being allocated to be handled according to a fourth of the handling methodologies, wherein:

the first handling methodology is to perform a wireless transmission to a vehicle-external location with any most immediately available one of wireless transmission modalities with which the vehicle is configured;

the second handling methodology is to perform a wireless transmission to the vehicle-external location with any most immediately available one of only a subset of the wireless transmission modalities with which the vehicle is configured;

the third handling methodology is to perform, at least during an immediate defined time period, an initial local storage in a local data storage of the vehicle without wireless transmission; and the fourth handling methodology is to be discarded without being transmitted;

d) performing, by the computer, the transmissions, local storage, and discarding according to the division of step c);

e) performing, by the computer, an autonomous driving control of the vehicle; and f) upon running out of storage space in the local data storage for a newly obtained datum, overwriting, by the computer, one or more of the received raw data previously stored in the local data storage, so that the autonomous driving control of the vehicle is not prematurely ended due to the local data storage being full, wherein the transmissions to the vehicle-external location provide data to an evaluation based on which a restriction previously placed on the autonomous driving control of the vehicle is removed.

6. A control unit of a vehicle, the control unit comprising a processor, wherein the processor is configured to:

a) receive raw data generated by sensors of the vehicle;

b) assign to each datum of the received raw data, a respective value for development and/or further development and/or serial operation of: vehicles and/or components of the vehicle, wherein the respective values are expressed as costs and wherein the assigning is performed using a cost function that, for each datum, characterizes the respective datum with respect to each of a plurality of predefined usability characteristics and that outputs, based on the characterizations, the respective single overall value assigned to the respective datum, wherein the usability characteristics include a technical relevancy characteristic that is assigned to the respective datum and that defines a predefined technical use for which the respective datum is relevant and/or a degree of relevance of the respective datum for the predefined technical use, a time characteristic of the respective datum, and/or a deviation from expectation characteristic of the respective datum;

c) divide the received raw data into different handling methodologies according to differences between the respective costs assigned to different respective data of the received raw data, with a first one or more of the received raw data, due to being assigned respective costs that are within a first value range, being allocated to be handled according to a first of the handling methodologies, a second one or more of the received raw data, due to being assigned respective costs that are within a second value range that is lower than the first value range, being allocated to be handled according to a second of the handling methodologies, a third one or more of the received raw data, due to being assigned respective costs that are within a third value range that is lower than the first and second value ranges, being allocated to be handled according to a third of the handling methodologies, and a fourth one or more of the received raw data, due to being assigned respective costs that are within a fourth value range that is lower than the first, second, and third value ranges, being allocated to be handled according to a fourth of the handling methodologies, wherein:

the first handling methodology is to perform a wireless transmission to a vehicle-external location with any most immediately available one of wireless transmission modalities with which the vehicle is configured;

the second handling methodology is to perform a wireless transmission to the vehicle-external location with any most immediately available one of only a subset of the wireless transmission modalities with which the vehicle is configured;

the third handling methodology is to perform, at least during an immediate defined time period, an initial local storage in a local data storage of the vehicle without wireless transmission; and the fourth handling methodology is to be discarded without being transmitted;

d) perform the transmissions, local storage, and deleting according to the division of step c);

e) perform an autonomous driving control of the vehicle; and f) upon running out of storage space in the local data storage for a newly obtained datum, overwrite one or more of the received raw data previously stored in the local data storage, so that the autonomous driving control of the vehicle is not prematurely ended due to the local data storage being full, wherein the transmissions to the vehicle-external location provide data to an evaluation based on which a restriction previously placed on the autonomous driving control of the vehicle is removed.

7. The method as recited in claim 1, wherein the assigning of the respective values expressed as costs is adapted, over time, based on observed utility of previously transmitted raw data for performing the evaluation.

* * * * *